April 22, 1941.   V. T. MOORE   2,239,111
DYNAMIC DAMPER
Filed April 6, 1940
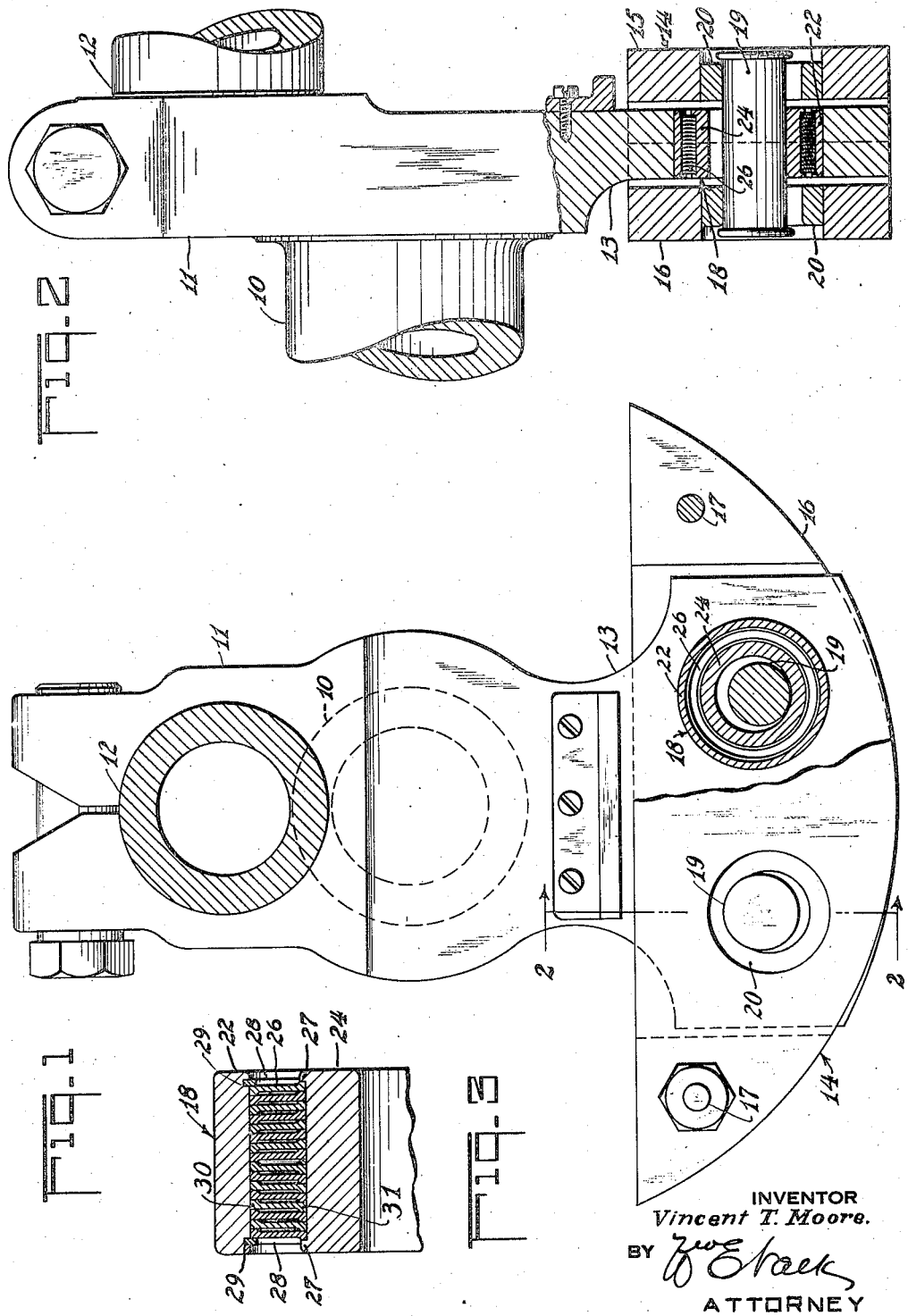
INVENTOR
*Vincent T. Moore.*
BY
ATTORNEY Patented Apr. 22, 1941

2,239,111

UNITED STATES PATENT OFFICE 2,239,111

DYNAMIC DAMPER

Vincent T. Moore, Port Washington, N. Y., assignor to Wright Aeronautical Corporation, a corporation of New York Application April 6, 1940, Serial No. 328,267

9 Claims. (Cl. 74—604)

This invention relates to torsional vibration balancing means for engines, and in particular comprises an improvement over the pendulum counterweight organization shown and described in Chilton Patent No. 2,112,984, issued April 5, 1938.

The pendulum counterweight, known generally as a "Dynamic Damper" according to the Chilton teaching, has gone into widespread use, and has been eminently successful. However, in a few installations certain vibrations of the crankshaft system are encountered which cause galling or scuffing of the tracks and rollers which serve as the support for the pendulum counterweight upon the crankshaft extension. This invention has for an object a provision of an axially yieldable connection between the crankshaft extension and the counterweight system whereby the extension is free to vibrate in an axial direction without transmitting this vibration to the counterweight system or to the support elements forming a part thereof.

A further object of the invention is to provide a bushing assembly having inner and outer parts which are axially yieldable relative to one another but which have a high degree of radial stiffness.

A further object is to incorporate an axially yieldable connection, having great radial stiffness, in a supporting system in a machine or more specifically, in a torsional pendulum organization.

A further object includes the provision of detailed structure by which inner and outer bushing elements are axially yieldable but radially rigid, wherein the degree of yield is small and wherein the bushing parts are in the main retained in a determinate axial position with respect to one another.

The provisions of the invention will be better understood by a reading of the annexed detailed description in connection with the drawing, in which:

Fig. 1 is an end elevation partly in section and partly broken away, of a crankshaft assembly including a torsional counterweight incorporating the invention;

Fig. 2 is a side elevation of a crankshaft, partly in section, on the line 2—2 of Fig. 1, and Fig. 3 is an enlarged view of a part of one of the components of the counterweight support.

In accordance with the general teachings of Patent No. 2,112,984, the structure shown includes a crankshaft journal 10 having an integral crankcheek 11 clamped to a crankpin 12 in the conventional manner, the crankcheek being extended as at 13 to comprise a support for a movable counterweight mass 14 which comprises counterweight halves 15 and 16 embracing the extension 13 in clearance relation thereto and secured together by bolts 17. The extension 13 is provided with spaced bores whose axes are parallel to the shaft axis and into each of which is fitted a bushing assembly designated in its entirety as 18, the bore of each assembly 18 comprising an arcuate track rollably supporting a pin 19 which, in turn, rollably engages bushings 20 fitted to the counterweight halves 15 and 16. The bores in the bushings 18 and 20 are of larger diameter than the pin 19 so that, when two pins are used, the counterweight 14 is freely movable as a simple pendulum whose length is determined by the diameters of the said bores and pins.

Now, as indicated in the above objectives, the extension 13 is susceptible to vibration in a direction parallel to the crankshaft axis which, if it be transmitted through the counterweight supporting assembly, causes axial sliding of the pins 19 upon their tracks with resultant wear and scuffing, since this movement is different from the true rolling contact in the plane of rotation, and the wear due to rolling contact is negligible. To allow the extension 13 to vibrate in the above manner without affecting the rolling contacts or the counterweight, I provide an axially yieldable arrangement incorporated in the bushing assembly 18, which is best shown in Fig. 3. The assembly 18 comprises an outer bushing 22 which is fitted to the bore of the extension 13, and an inner bushing 24 in radially spaced relation to the bushing 22, the bore of the bushing 24 providing the rolling track for the pin 19. In the annular space between the two bushings, a plurality of flat rings or washers 26 are stacked, the washers individually being quite thin so that they are readily yieldable axially between their outer and inner peripheries. The washers are closely fitted to respective bushings and are secured against axial displacement by flanges 27 on the bushing 24 which define an annular channel within which the washers seat; they are retained in the outer bushing 22 by snap rings 28 assembled in grooves 29 formed in the bore of the bushing 22. The washers individually are thickened at their outer and inner edges so that when assembled the portions between the outer and inner edges are in clearance relation to avoid frictional effect as the washers are jointly warped upon axial displacement of the bushing 24 with respect to the bushing 22.

As a simple means of assembling this bushing unit 18, the several washers 26 may be split or may be made in semicircular halves which are assembled in the annular channel of the bushing 24 after which the bushing 22 is pressed over the outside of the several washers and is secured by the snap rings 28. Various other detailed arrangements may be used for assembling the washer elements in the bushing assembly, but the one indicated is a practical solution, though not necessarily a preferred one. Since the stack of washers are rigid in a radial sense and are not subject to yield upon the application of purely radial loads, they serve adequately to support the counterweight assembly against outward displacement due to centrifugal force. However, if axial forces be applied between the bushings 22 and 24, slight axial yield may occur with relatively little restraint to axial movement if the aggregate yield is small. The resistance to such axial yield with small displacements is considerably less than the coefficient of sliding friction between the pins 19 and their respective roller tracks, so that small axial movements between the crankshaft extension 13 and the counterweight assembly would be taken up in the bushing assembly 18 without causing sliding of the roller pins upon their tracks. However, if a large force be applied tending to move the inner bushing 24 axially with respect to the outer bushing 22, the several washers 26 would resist such displacement, as they would then act after the manner of belleville washers which, as is well known, provide a very stiff spring.

As is shown in Fig. 3, the outer and inner flanges 30 and 31, respectively, of the washers 26 are formed on opposite sides of the central part of the washer, and the washers are so arranged that those washers on each side of the plane of symmetry have their flanges facing in opposite directions. By this arrangement the washers on the left side of the plane of symmetry will have considerable resistance to substantial displacement of the outer bushing 22 leftwardly with respect to the inner bushing 24, while the washers on the right side of the plane of symmetry will have a large effect in resisting opposite movement.

This form of axially yieldable joint eliminates the need for sliding bushings or the like, confining the relative axial movement to these thin washers which can readily be fabricated for great fatigue resistance.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a pendulum counterweight for a shaft system comprising a shaft extension embraced by the counterweight and a pin loosely connecting the counterweight with the extension, a bushing in the extension on which said pin rollably bears, and a plurality of flat annuli stacked upon and embracing the bushing, the annuli being fitted to the extension.

2. In a pendulum counterweight mounting on a shaft system, a shaft extension having a bore, a plurality of annular laminations fitted to said bore and secured against axial displacement, a bushing fitted to the openings of said laminations and constrained against axial displacement relative thereto, and a pin rollably engaging the bushing bore surface upon which said counterweight is suspended.

3. In a pendulum counterweight system comprising counterweight and support members freely movable on an arcuate path relative to one another, one member having a bore, a stack of substantially flat axially deformable rings fitted to the bore, an annular track member fitted to the aggregate bores of the rings, whereby the track member is movable axially due to ring deformation relative to the member, and roller means engaging said track and the other said member.

4. An axially deformable, radially rigid bushing assembly for a mechanism comprising outer and inner annular members radially spaced to define therebetween an annular space, a plurality of flat rings of elastic metal having a high modulus of elasticity stacked within said space, the rings being fitted to and constrained against sliding relative to the outer and inner members respectively at the outer and inner edges of the rings, and said rings being of such thinness as to be susceptible to substantial axial distortion between their outer and inner edges but having great resistance to yield radially thereof.

5. An axially yieldable bushing assembly having great radial stiffness, comprising a stack of flat rings of elastic metal having a high modulus of elasticity, bushings fitted to the inner and outer peripheries of said rings, and means anchoring respective bushings from axial displacement relative to the ring peripheries to which they are fitted, whereby axial displacement between the bushings enforces axial yield of the rings between their outer and inner peripheries and radial force between the bushings is transmitted edgewise through the rings with substantially no yield thereof.

6. An axially yieldable bushing assembly comprising inner and outer bushing members having annular channels respectively exteriorly and interiorly thereof, and a stack of flat rings engaging respective channels and bridging the members, said flat rings being axially yieldable to allow of yield of the bushing members.

7. An axially yieldable bushing assembly comprising inner and outer bushing members having annular channels respectively exteriorly and interiorly thereof, and a stack of flat rings engaging respective channels and bridging the members, said flat rings being axially yieldable to allow of yield of the bushing members, the stack of flat rings completely filling the respective member channels.

8. An axially yieldable bushing assembly comprising inner and outer bushing members having annular channels respectively exteriorly and interiorly thereof, and a stack of flat rings engaging respective channels and bridging the members, said flat rings being axially yieldable to allow of yield of the bushing members, said flat rings being split to allow of assembly in at least one of said channels.

9. An axially yieldable bushing assembly comprising an annular channel member, a plurality of flat split rings stacked in and fitted to the channel member, a second annular member fitted to the ring stack, and means to constrain the second member against axial movement relative to the portion of the ring stack to which it is fitted; the ring stack however being axially yieldable between its outer and inner periphery to allow of axial yield of the members.

VINCENT T. MOORE.